(12) United States Patent
Kida et al.

(10) Patent No.: US 6,574,093 B2
(45) Date of Patent: Jun. 3, 2003

(54) SOLID STATE ELECTROLYTIC CAPACITOR WITH AN ANODE LEAD TERMINAL

(75) Inventors: Fumio Kida, Toyama (JP); Takashi Kono, Toyama (JP)

(73) Assignee: NEC Tokin Toyama, Ltd., Toyama (JP)

( * ) Notice: Subject to any disclaimer, the term of this patent is extended or adjusted under 35 U.S.C. 154(b) by 0 days.

(21) Appl. No.: 09/893,730

(22) Filed: Jun. 29, 2001

(65) Prior Publication Data

US 2002/0001167 A1 Jan. 3, 2002

(30) Foreign Application Priority Data

Jun. 29, 2000 (JP) ......................................... 2000-195476

(51) Int. Cl.[7] ................................................. H01G 9/04
(52) U.S. Cl. ........................ 361/516; 361/540; 29/25.03
(58) Field of Search ................................. 361/523, 516, 361/540; 257/702; 29/25.03

(56) References Cited

U.S. PATENT DOCUMENTS 3,828,227 A * 8/1974 Millard et al. .............. 361/540
5,001,607 A * 3/1991 Breithaupt ................... 361/516

FOREIGN PATENT DOCUMENTS

JP          B2 5-19292       3/1993

* cited by examiner

*Primary Examiner*—Shawn Riley
(74) *Attorney, Agent, or Firm*—Young & Thompson

(57) ABSTRACT

The present invention provides a solid state electrolytic capacitor having an improved anode lead terminal having first and second side edges distanced from each other in a longitudinal direction of the anode lead terminal, wherein a center position on the first side edge is retracted from opposite side positions on the top edge, and the opposite side positions are distanced in a perpendicular direction to the longitudinal direction.

22 Claims, 14 Drawing Sheets

SOLID STATE ELECTROLYTIC CAPACITOR WITH AN ANODE LEAD TERMINAL

BACKGROUND OF THE INVENTION

1. Field of the Invention

The present invention relates to a solid state electrolytic capacitor and a method of forming the same, and more particularly to a solid state electrolytic capacitor with an improved anode lead terminal and a method of forming the same.

2. Description of the Related Art

A chip type solid state electrolytic capacitor has been known as one of the solid state electrolytic capacitors. FIG. 1 is a schematic perspective view of a partial internal structure of a conventional chip type solid state electrolytic capacitor. FIG. 2 is a cross sectional elevation view of the conventional chip type solid state electrolytic capacitor of FIG. 1. The internal structure of the conventional chip type solid state electrolytic capacitor will hereinafter be described with reference to FIGS. 1 and 2.

The chip type solid state electrolytic capacitor 7 has a cathode lead terminal 1, a device pellet 3, and an anode lead terminal 6. The device pellet 3 has a cathode layer. The cathode lead terminal 1 is adhered via an electrically conductive adhesive agent 8 to the cathode layer of the device pellet 3. The device pellet 3 also has an pellet lead wire 4 which is welded through a weld-bonding portion 5 to the anode lead terminal 6. The capacitor 7 is encapsulated with an encapsulating resin 2, wherein respective parts of the cathode lead terminal 1 and the anode lead terminal 6 are exposed from the encapsulating resin 2. The exposed parts of the cathode lead terminal 1 and the anode lead terminal 6 extend along opposite side walls of the encapsulating resin 2 and along bottom recesses of the encapsulating resin 2.

FIG. 3A is a cross sectional elevation view of unassembled original cathode and anode lead terminals prior to assembling or fabricating process to form the conventional chip type solid state electrolytic capacitor of FIG. 1. FIG. 3B is a plan view of unassembled original cathode and anode lead terminals of FIG. 3A. The unassembled original cathode lead terminal 1 has a modified flat level with a step-like bent portion in cross sectional view. The unassembled original anode lead terminal 6 has a just flat level in cross sectional view. In plan view, the unassembled original cathode and anode lead terminals 1 and 6 have the same plan shape as each other.

Plural cathode lead terminals 1 extend from a cathode side lead frame portion 9a in a direction perpendicular to a longitudinal direction of the cathode side lead frame portion 9a. The plural cathode lead terminals 1 extend in parallel to each other and are aligned in a constant pitch in the longitudinal direction of the cathode side lead frame portion 9a.

Each of the cathode lead terminals 1 has a plan shape which comprises a base portion 1a, a narrowed intermediate portion 1b and a top portion 1c. The base portion 1a extends from the cathode side lead frame portion 9a. The base portion 1a has a constant width. The base portion 1a is flat. The narrowed intermediate portion 1b extends from the base portion 1a. The narrowed intermediate portion 1b has a reduced width. The narrowed intermediate portion 1b is flat. The top portion 1c extends from the intermediate portion 1b. The top portion 1c has a rectangle shape with the same width as the base portion 1a. The top portion 1c is not flat, and is bent in step-like shape in cross sectional view. The top portion 1c has a top edge defined by a straight line parallel to the longitudinal direction of the cathode side lead frame portion 9a.

Plural anode lead terminals 6 extend from an anode side lead frame portion 9b in a direction perpendicular to a longitudinal direction of the anode side lead frame portion 9b. The plural anode lead terminals 6 extend in parallel to each other and are aligned in a constant pitch in the longitudinal direction of the anode side lead frame portion 9b. This pitch is the same as the pitch of the cathode lead terminals 1.

Each of the anode lead terminals 6 has the same plan shape as the cathode lead terminals 1. The anode lead terminal 6 comprises a base portion 6a, a narrowed intermediate portion 6b and a top portion 6c. The base portion 6a extends from the anode side lead frame portion 9b. The base portion 6a has a constant width. The base portion 6a is flat. The narrowed intermediate portion 6b extends from the base portion 6a. The narrowed intermediate portion 6b has a reduced width. The narrowed intermediate portion 6b is flat. The top portion 6c extends from the intermediate portion 6b. The top portion 6c has a rectangle shape with the same width as the base portion 6a. The top portion 6c is flat. The top portion 6c has a top edge defined by a straight line parallel to the longitudinal direction of the anode side lead frame portion 9b.

A set of the cathode side and anode side lead frame portions 9a and 9b, the plural cathode and anode lead terminals 1 and 6 forms a single lead frame 9.

FIG. 4A is a fragmentary plan view of an anode lead terminal which is weld-bonded through an pellet lead wire to a device pellet, wherein the pellet lead wire is parallel to the anode lead terminal. FIG. 4B is a fragmentary plan view of an anode lead terminal which is weld-bonded through an pellet lead wire to a device pellet, wherein the pellet lead wire is tilted with reference to the anode lead terminal.

As illustrated in FIG. 4A, the pellet lead wire 4 is parallel to the longitudinal direction of the anode lead terminal 6 and perpendicular to the top straight edge of the anode lead terminal 6. An overlap region 4d between the pellet lead wire 4 and the anode lead terminal 6 is the desired one. This desired overlap region 4d ensures a sufficient and uniform area for obtaining a sufficient and uniform weld-bonding strength.

As illustrated in FIG. 4B, the pellet lead wire 4 is not parallel to and tilted from the longitudinal direction of the anode lead terminal 6. The pellet lead wire 4 is not perpendicular to the top straight edge of the anode lead terminal 6. An overlap region 4c between the pellet lead wire 4 and the anode lead terminal 6 is the undesirable one. This undesirable overlap region 4e is smaller in area than the above desired one. This undesirable overlap region 4e obtains an insufficient and non-uniform area for obtaining an insufficient and non-uniform weld-bonding strength.

In order to avoid the problem shown in FIG. 4B, the length of the pellet lead wire 4 is increased to increase the overlap area 4e for the purpose of obtaining the sufficient and uniform weld-bonding strength. Under a condition of a fixed size of the case containing the capacitor, the increase in length of the pellet lead wire 4 needs a reduction in size of the device pellet 3.

It was proposed to increase the length of the anode lead terminal 6 for narrowing a gap between the device pellet 3 and the anode lead terminal 6 in order to increase the overlap area 4e for the purpose of obtaining the sufficient and uniform weld-bonding strength. Narrowing the gap between the device pellet 3 and the anode lead terminal 6 increases a possibility of undesired contact between the device pellet 3 and the anode lead terminal 6, whereby a short circuit is undesirably formed between the device pellet 3 and the anode lead terminal 6.

In order to avoid the contact between the device pellet 3 and the anode lead terminal 6, an insulating material is inserted into the gap between the device pellet 3 and the anode lead terminal 6. The gap size in this case is larger than the above narrowed gap size because the insulating material is inserted into the gap. The increase in the size of the gap also needs size reduction of the capacitor.

A further size reduction of the capacitor is desired. Further increases in the bonding strength and the bonding stability between the anode lead terminal and the pellet lead wire are also desired. The conventional technique is unable to obtain both the size reduction of the capacitor and the increases in the bonding strength and the bonding stability between the anode lead terminal and the pellet lead wire.

In the above circumstances, the development of a novel solid-state electrolyte capacitor free from the above problems is thus desirable.

SUMMARY OF THE INVENTION

Accordingly, it is an object of the present invention to provide a novel solid-state electrolyte capacitor free from the above problems free from the above problems.

It is a further object of the present invention to provide a novel solid-state electrolyte capacitor reduced in size and having increased bonding strength stability between an anode lead terminal and a pellet lead wire.

It is a still further object of the present invention to provide a novel anode lead terminal of the solid-state electrolyte capacitor free from the above problems.

It is yet a further object of the present invention to provide a novel anode lead terminal of the solid-state electrolyte capacitor reduced in size and having increased bonding strength stability between the anode lead terminal and a pellet lead wire.

The present invention provides a solid state electrolytic capacitor having an improved anode lead terminal having first and second side edges distanced from each other in a longitudinal direction of the anode lead terminal, wherein a center position on the first side edge is retracted from opposite side positions on the top edge, and the opposite side positions are distanced in a perpendicular direction to the longitudinal direction.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DETAILED DESCRIPTION OF THE PREFERRED EMBODIMENTS

Figure 1:
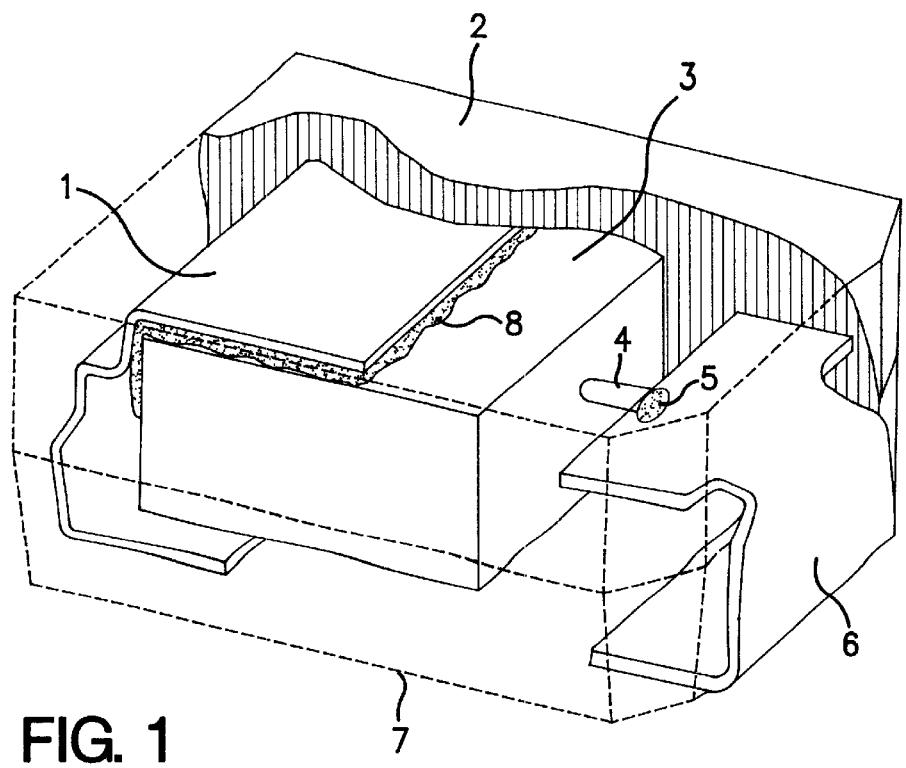
FIG. 1 is a schematic perspective view of a partial internal structure of a conventional chip type solid state electrolytic capacitor.
Figure 2:
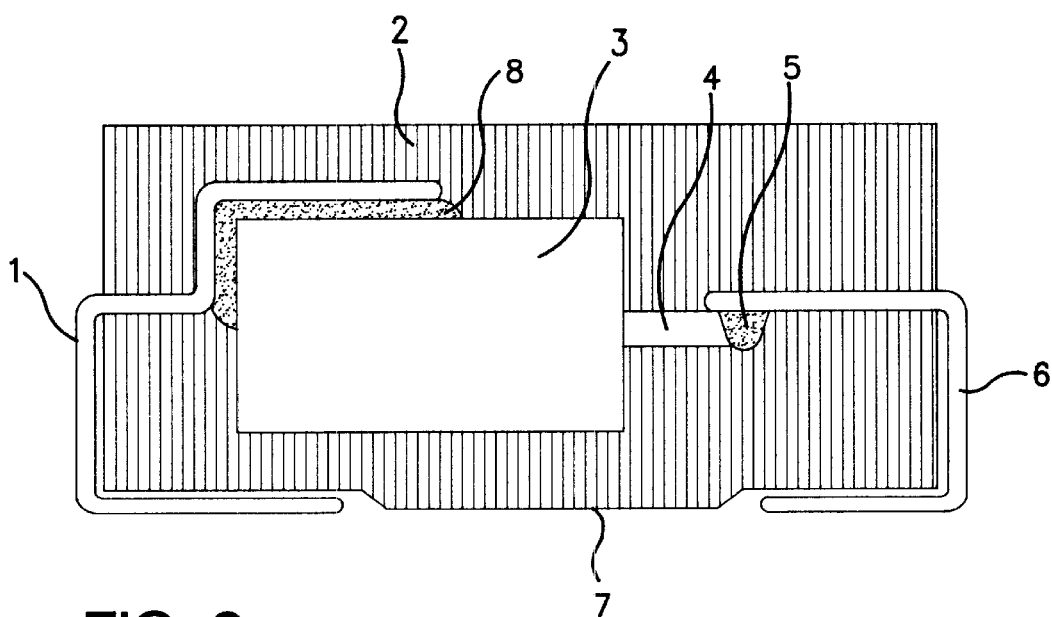
FIG. 2 is a cross sectional elevation view of the conventional chip type solid state electrolytic capacitor of FIG. 1.
Figure 3A:
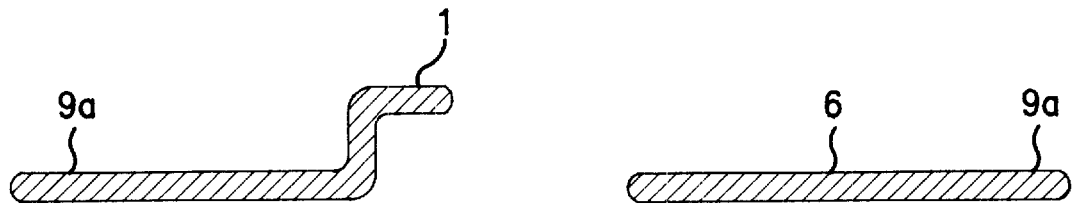
FIG. 3A is a cross sectional elevation view of unassembled original cathode and anode lead terminals prior to assembling or fabricating process to form the conventional chip type solid state electrolytic capacitor of FIG. 1.
Figure 3B:
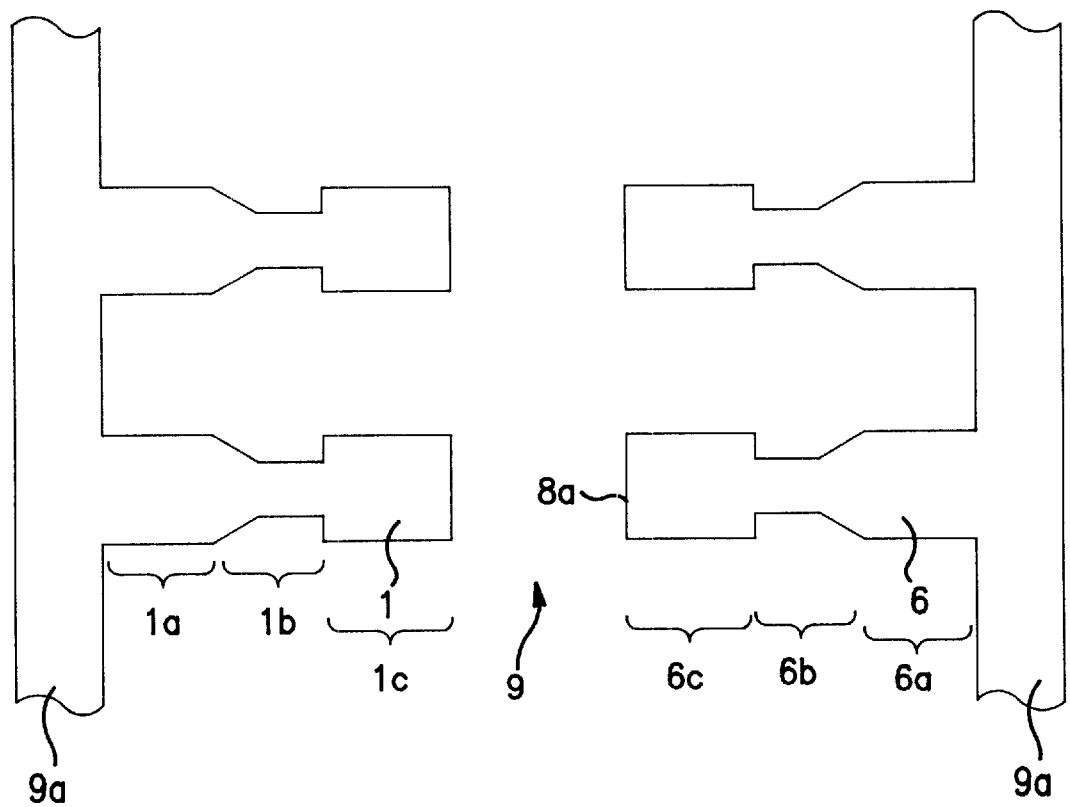
FIG. 3B is a plan view of unassembled original cathode and anode lead terminals of FIG. 3A.
Figure 4A:
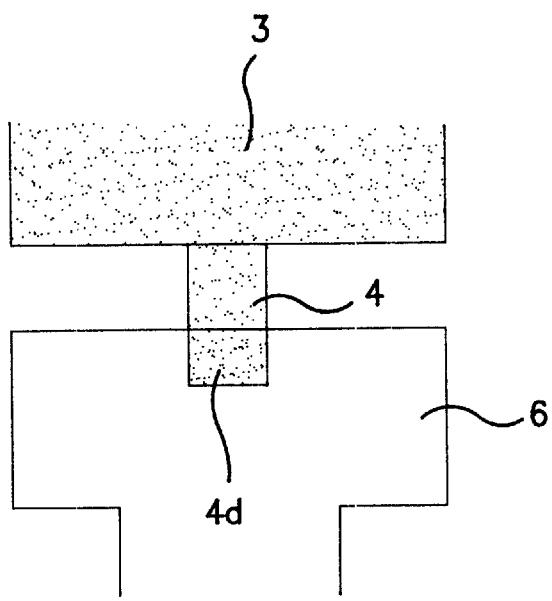
FIG. 4A is a fragmentary plan view of an anode lead terminal which is weld-bonded through an pellet lead wire to a device pellet, wherein the pellet lead wire is parallel to the anode lead terminal.
Figure 4B:
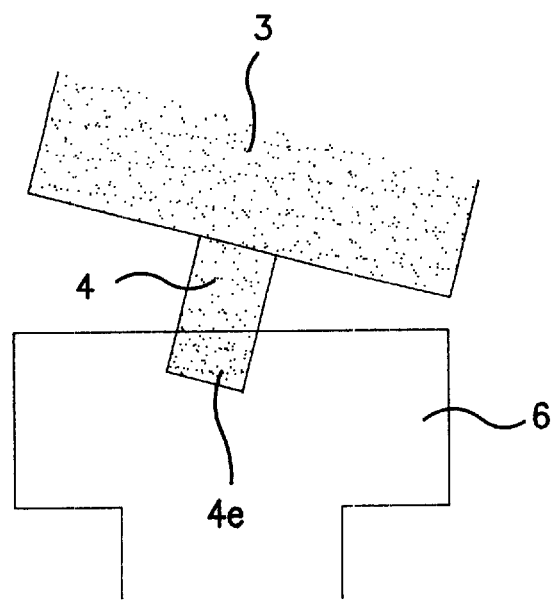
FIG. 4B is a fragmentary plan view of an anode lead terminal which is weld-bonded through an pellet lead wire to a device pellet, wherein the pellet lead wire is tilted with reference to the anode lead terminal.

A first aspect of the present invention is an anode lead terminal having first and second side edges distanced from each other in a longitudinal direction of the anode lead terminal, wherein a center position on the first side edge is retracted from opposite side positions on the top edge, and the opposite side positions are distanced in a perpendicular direction to the longitudinal direction.

It is possible that the center position on the first side edge is retracted non-linearly. It is further possible that the first side edge is defined by a circular-arc line segment in plan view.

Alternatively, it is possible that the center position on the first side edge is retracted linearly. It is further possible that the first side edge is defined by a V-shape line segment in plan view.

A second aspect of the present invention is an anode lead terminal having first and second side edges distanced from each other in a longitudinal direction of the anode lead terminal, wherein a center position on the first side edge is closer to the second side edge than opposite side positions on the top edge, and the opposite side positions are distanced in a perpendicular direction to the longitudinal direction.

A third aspect of the present invention is an anode lead terminal having first and second side edges distanced from each other in a longitudinal direction of the anode lead terminal, wherein a distance of the first side edge from the second side edge is decreased in inward directions from opposite side positions on the top edge to a center position of the top edge, and the opposite side positions are distanced in a perpendicular direction to the longitudinal direction.

It is possible that the distance is decreased non-linearly. It is further possible that the first side edge is defined by a circular-arc line segment in plan view.

Alternatively, it is possible that the distance is decreased linearly. It is further possible that the first side edge is defined by a V-shape line segment in plan view.

A fourth aspect of the present invention is a solid state electrolytic capacitor comprising: a device pellet; a cathode lead terminal connected to a first part of said device pellet; a lead wire connected to a second part of said device pellet; and an anode lead terminal connected to the lead wire, and the anode lead terminal having first and second side edges distanced from each other in a longitudinal direction of the anode lead terminal, and the first side edge of the anode lead terminal being bonded with the lead wire, wherein a center position on the first side edge is retracted from opposite side positions on the top edge, and the opposite side positions are distanced in a perpendicular direction to the longitudinal direction.

It is possible that the center position on the first side edge is retracted non-linearly. It is further possible that the first side edge is defined by a circular-arc line segment in plan view.

Alternatively, it is possible that the center position on the first side edge is retracted linearly. It is further possible that the first side edge is defined by a V-shape line segment in plan view.

A fifth aspect of the present invention is a solid state electrolytic capacitor comprising: a device pellet; a cathode lead terminal connected to a first part of said device pellet; a lead wire connected to a second part of said device pellet; and an anode lead terminal connected to the lead wire, and the anode lead terminal having first and second side edges distanced from each other in a longitudinal direction of the anode lead terminal, and the first side edge of the anode lead terminal being bonded with the lead wire, wherein a center position on the first side edge is closer to the second side edge than opposite side positions on the top edge, and the opposite side positions are distanced in a perpendicular direction to the longitudinal direction.

A sixth aspect of the present invention is a solid state electrolytic capacitor comprising: a device pellet; a cathode lead terminal connected to a first part of said device pellet; a lead wire connected to a second part of said device pellet; and an anode lead terminal connected to the lead wire, and the anode lead terminal having first and second side edges distanced from each other in a longitudinal direction of the anode lead terminal, and the first side edge of the anode lead terminal being bonded with the lead wire, wherein a distance of the first side edge from the second side edge is decreased in inward directions from opposite side positions on the top edge to a center position of the top edge, and the opposite side positions are distanced in a perpendicular direction to the longitudinal direction.

It is possible that the distance is decreased non-linearly. It is further possible that the first side edge is defined by a circular-arc line segment in plan view.

Alternatively, it is possible that the distance is decreased linearly. It is further possible that the first side edge is defined by a V-shape line segment in plan view.

First Embodiment

Figure 5:
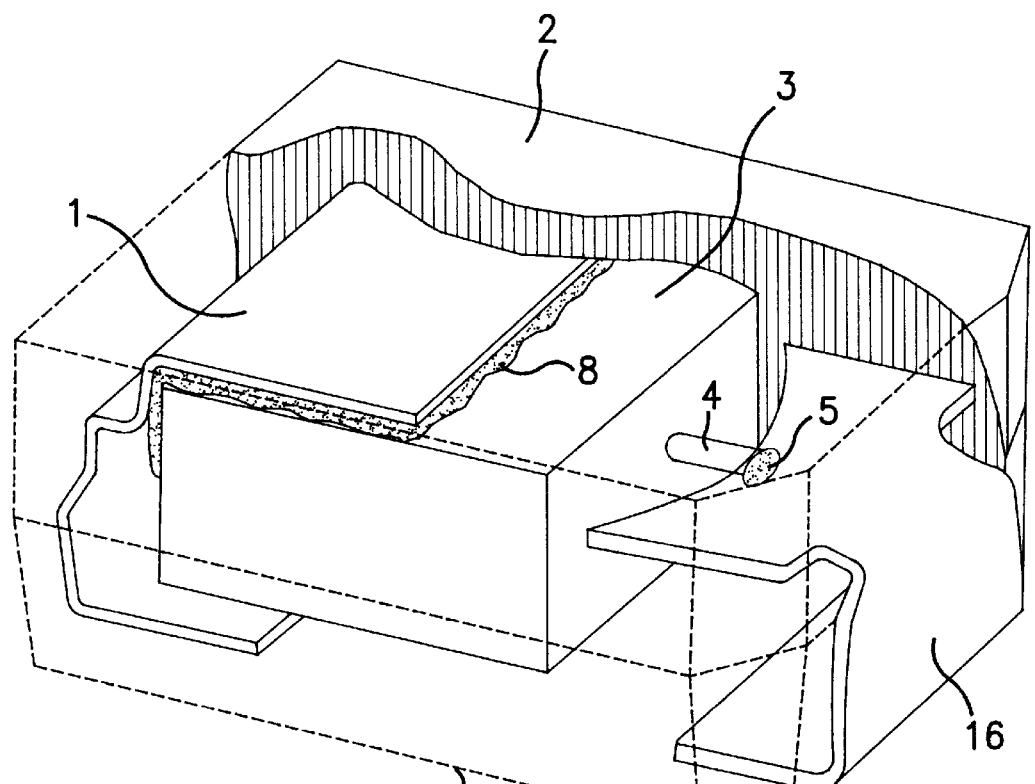
FIG. 5 is a schematic perspective view of a partial internal structure of a novel chip type solid state electrolytic capacitor in a first preferred embodiment in accordance with the present invention.
Figure 6:
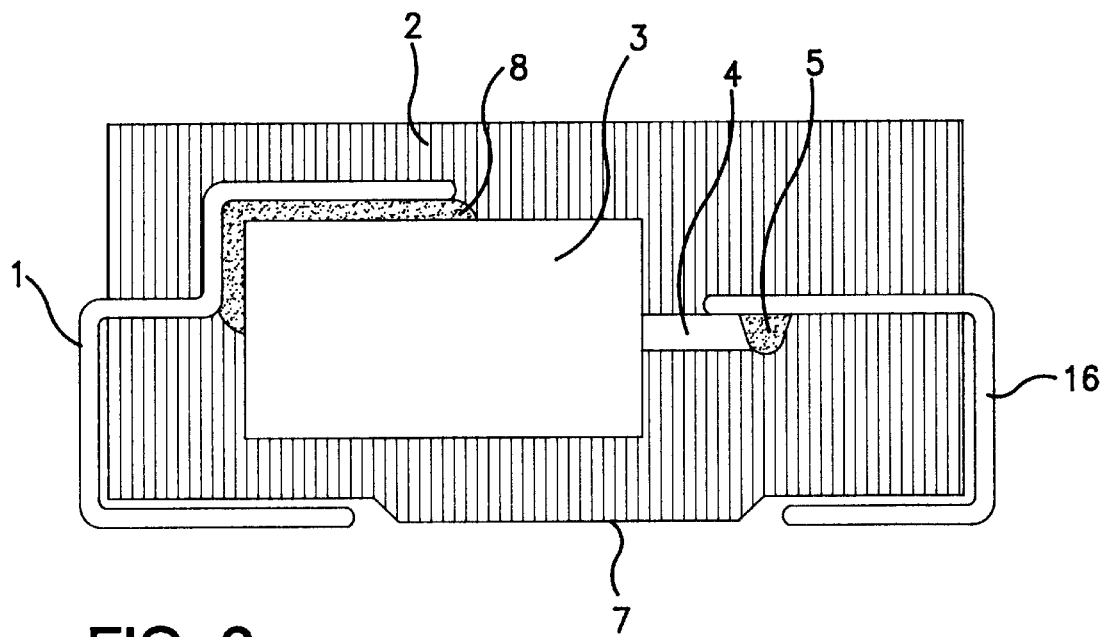
FIG. 6 is a cross sectional elevation view of the novel chip type solid state electrolytic capacitor of FIG. 5.

A first embodiment according to the present invention will be described in detail with reference to the drawings. A novel chip type solid state electrolytic capacitor is provided. FIG. 5 is a schematic perspective view of a partial internal structure of a novel chip type solid state electrolytic capacitor in a first preferred embodiment in accordance with the present invention. FIG. 6 is a cross sectional elevation view of the novel chip type solid state electrolytic capacitor of FIG. 5. The internal structure of the novel chip type solid state electrolytic capacitor will hereinafter be described with reference to FIGS. 5 and 6.

The chip type solid state electrolytic capacitor 7 has a cathode lead terminal 1, a device pellet 3, and an anode lead terminal 16. The device pellet 3 has a cathode layer. The cathode lead terminal 1 is adhered via an electrically conductive adhesive agent 8 to the cathode layer of the device pellet 3. The device pellet 3 also has an pellet lead wire 4 which is welded through a weld-bonding portion 5 to the anode lead terminal 16. The capacitor 7 is encapsulated with an encapsulating resin 2, wherein respective parts of the cathode lead terminal 1 and the anode lead terminal 16 are exposed from the encapsulating resin 2. The exposed parts of the cathode lead terminal 1 and the anode lead terminal 16 extend along opposite side walls of the encapsulating resin 2 and along bottom recesses of the encapsulating resin 2.

Figure 7A:
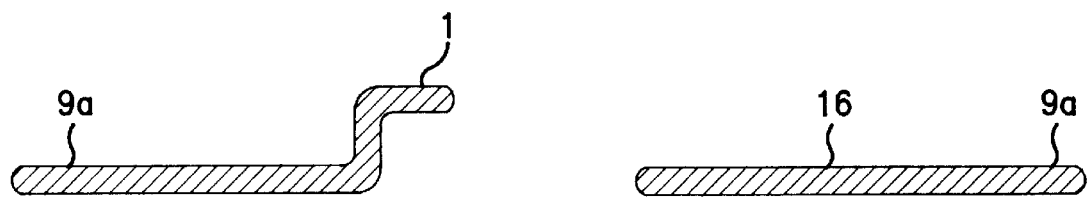
FIG. 7A is a cross sectional elevation view of unassembled original cathode and anode lead terminals prior to assembling or fabricating process to form the novel chip type solid state electrolytic capacitor of FIG. 5.
Figure 7B:
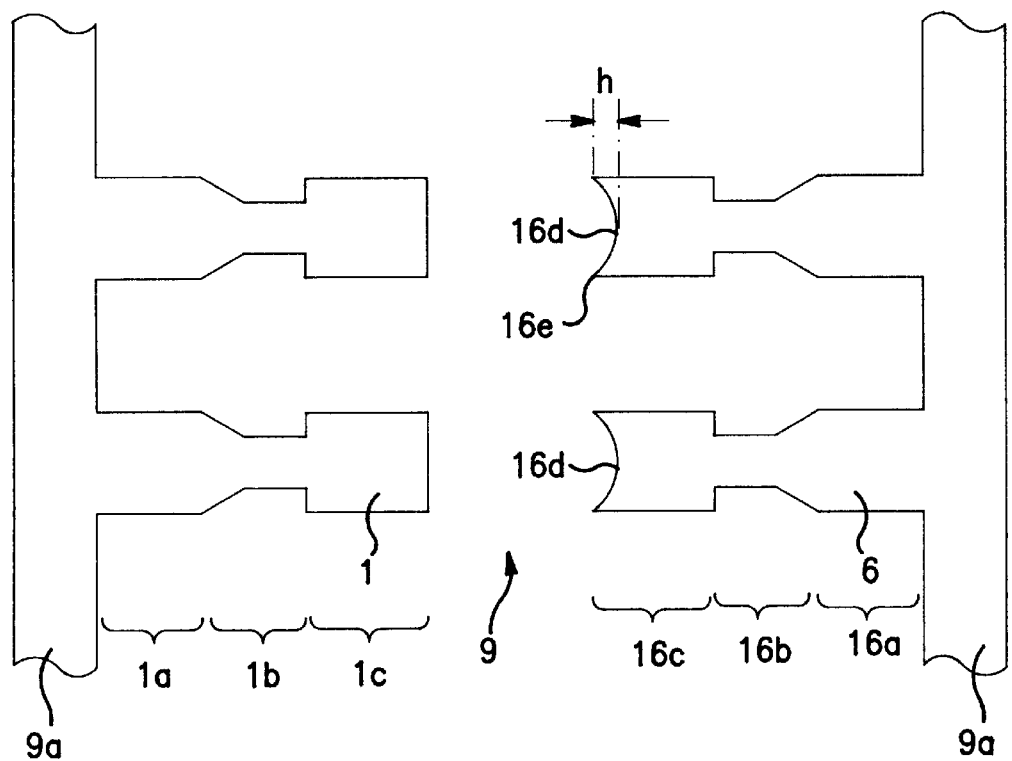
FIG. 7B is a plan view of unassembled original cathode and anode lead terminals of FIG. 7A.

FIG. 7A is a cross sectional elevation view of unassembled original cathode and anode lead terminals prior to assembling or fabricating process to form the novel chip type solid state electrolytic capacitor of FIG. 5. FIG. 7B is a plan view of unassembled original cathode and anode lead terminals of FIG. 7A. The unassembled original cathode lead terminal 1 has a modified flat level with a step-like bent portion in cross sectional view. The unassembled original anode lead terminal 16 has a just flat level in cross sectional view. In plan view, the unassembled original cathode and anode lead terminals 1 and 16 are different in shape from each other.

Plural cathode lead terminals 1 extend from a cathode side lead frame portion 9a in a direction perpendicular to a longitudinal direction of the cathode side lead frame portion 9a. The plural cathode lead terminals 1 extend in parallel to each other and are aligned in a constant pitch in the longitudinal direction of the cathode side lead frame portion 9a.

Each of the cathode lead terminals 1 has a plan shape which comprises a base portion 1a, a narrowed intermediate portion 1b and a top portion 1c. The base portion 1a extends from the cathode side lead frame portion 9a, The base portion 1a has a constant width. The base portion 1a is flat. The narrowed intermediate portion 1b extends from the base portion 1a. The narrowed intermediate portion 1b has a reduced width. The narrowed intermediate portion 1b is flat. The top portion 1c extends from the intermediate portion 1b. The top portion 1c has a rectangle shape with the same width as the base portion 1a. The top portion 1c is not flat, and is bent in step-like shape in cross sectional view. The top portion 1c has a top edge defined by a straight line parallel to the longitudinal direction of the cathode side lead frame portion 9a.

Plural anode lead terminals 16 extend from an anode side lead frame portion 9b in a direction perpendicular to a longitudinal direction of the anode side lead frame portion 9b. The plural anode lead terminals 16 extend in parallel to each other and are aligned in a constant pitch in the longitudinal direction of the anode side lead frame portion 9b. This pitch is the same as the pitch of the cathode lead terminals 1.

Each of the anode lead terminals 16 is flat and different in plan shape from the cathode lead terminals 1. The anode lead terminal 16 comprises a base portion 16a, a narrowed intermediate portion 16b and a top portion 16c. The base portion 16a extends from the anode side lead frame portion 9b. The base portion 16a has a constant width. The base portion 16a is flat. The narrowed intermediate portion 16b extends from the base portion 16a. The narrowed intermediate portion 16b has a reduced width. The narrowed intermediate portion 16b is flat. The top portion 16c extends from the intermediate portion 16b.

The top portion 16c has a modified rectangle shape with the same width as the base portion 16a. The top portion 16c is flat. The top portion 16c has a top edge defined by a circular-arc line in plan view. A length of the top portion 16c in parallel to the longitudinal direction of the anode lead terminal 16 is decreased non-linearly in inward directions from opposite sides positions 16e to a center position 16d, so that the circular-arc-defined top edge is retracted by an amount "h" at the center position 16d. It may be regarded that a length of the top portion 16c in parallel to the longitudinal direction of the anode lead terminal 16 is increased non-linearly in outward directions from the center position 16d to opposite sides positions 16c, so that the circular-arc-defined top edge extends by the amount "h" at the opposite sides positions 16e. The amount "h" may preferably be in the range of 1/10 to 1/4 of a longitudinal length of an exposed part of the device pellet lead from the device pellet 3.

A set of the cathode side and anode side lead frame portions 9a and 9b, the plural cathode and anode lead terminals 1 and 16 forms a single lead frame 9.

FIGS. 8A through 8F are cross sectional elevation views of the chip-type solid state electrolytic capacitor.

Figure 8A:
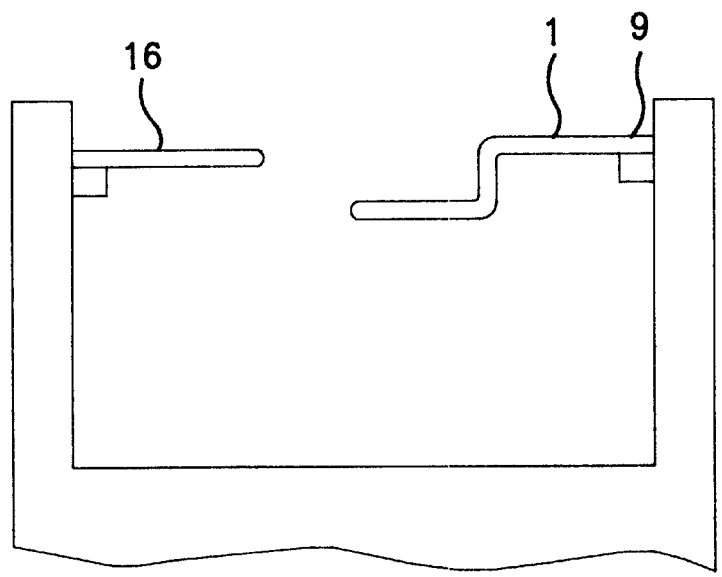
FIGS. 8A through 8F are cross sectional elevation views of the chip-type solid state electrolytic capacitor.

With reference to FIG. 8A, the lead frame 9 including the cathode and anode lead terminals 1 and 16 is mounted on a work stage.

Figure 8B:
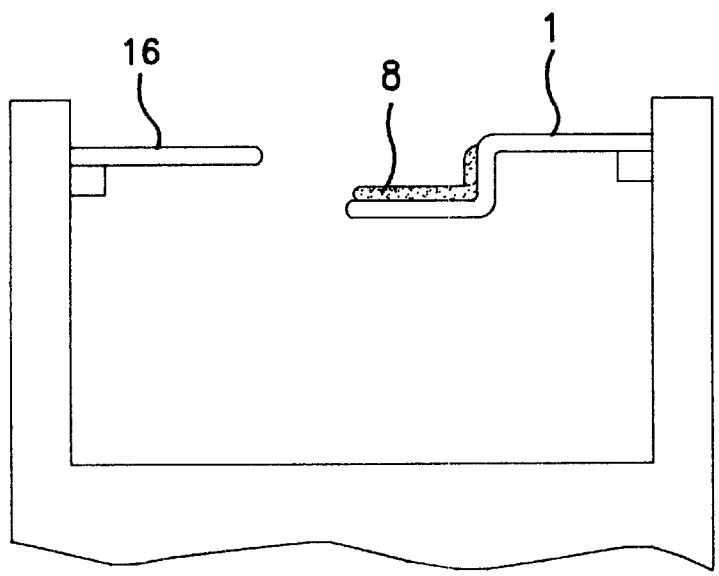

With reference to FIG. 8B, an electrically conductive adhesive agent 8 is applied on a stepped portion of the cathode lead terminal 1.

Figure 8C:
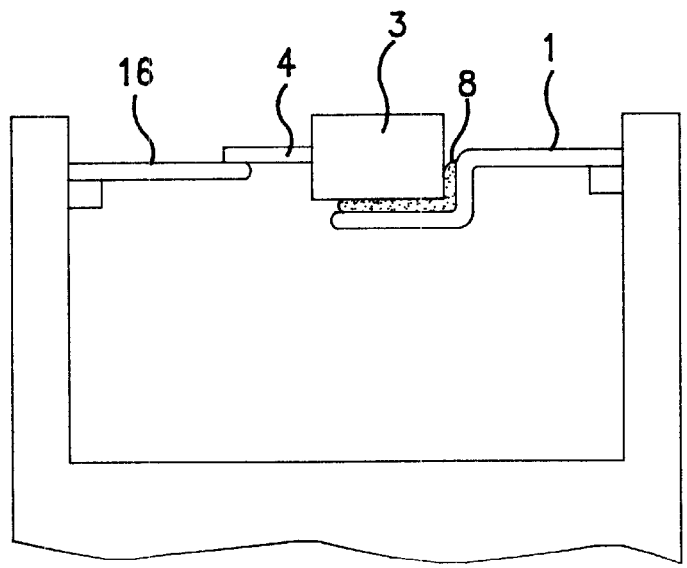

With reference to FIG. 8C, a device pellet 3 with a device pellet lead wire 4 is placed on the electrically conductive adhesive agent 8, so that the device pellet 3 is adhered via the electrically conductive adhesive agent 8 to the stepped portion of the cathode lead terminal 1. The device pellet lead wire 4 is made into contact with the anode lead terminal 16.

Figure 8D:
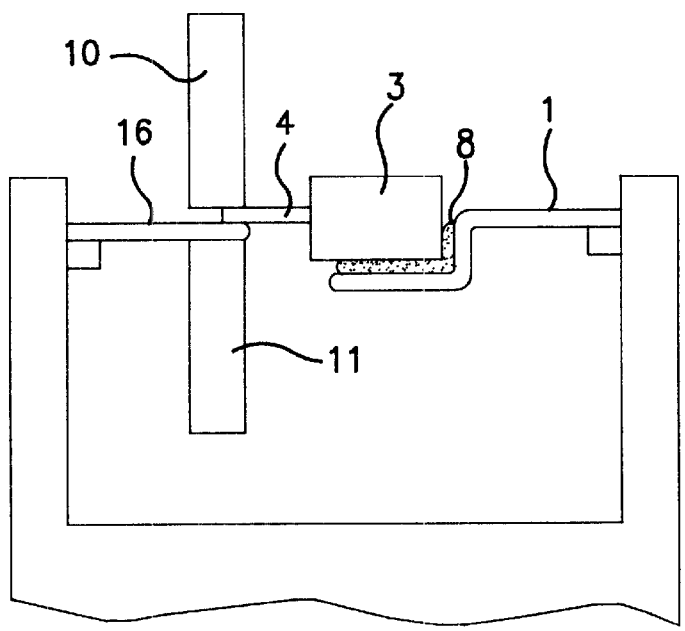

With reference to FIG. 8D, top and bottom electrodes 10 and 11 of a welding apparatus sandwich the device pellet lead wire 4 and the anode lead terminal 16 at a predetermined pressure from up and down directions for welding the same, whereby the device pellet lead wire 4 is bonded to the anode lead terminal 16.

Figure 8E:
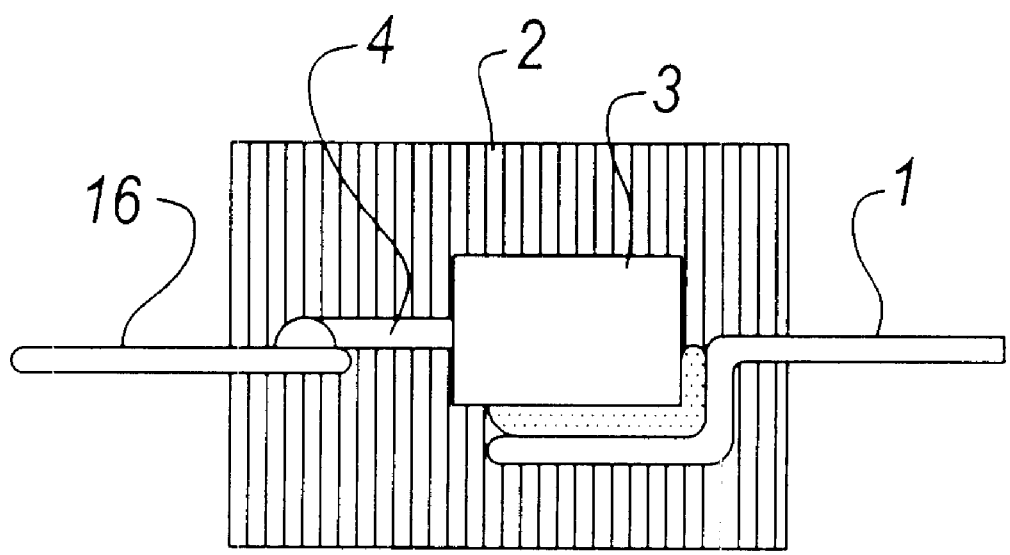

With reference to FIG. 8E, after baking the electrically conductive adhesive agent 8, a transfer molding process is carried out for encapsulating the device with a molding resin 2, wherein outer parts of the cathode and anode lead terminals 1 and 16 are projected from the molding resin 2.

Figure 8F:
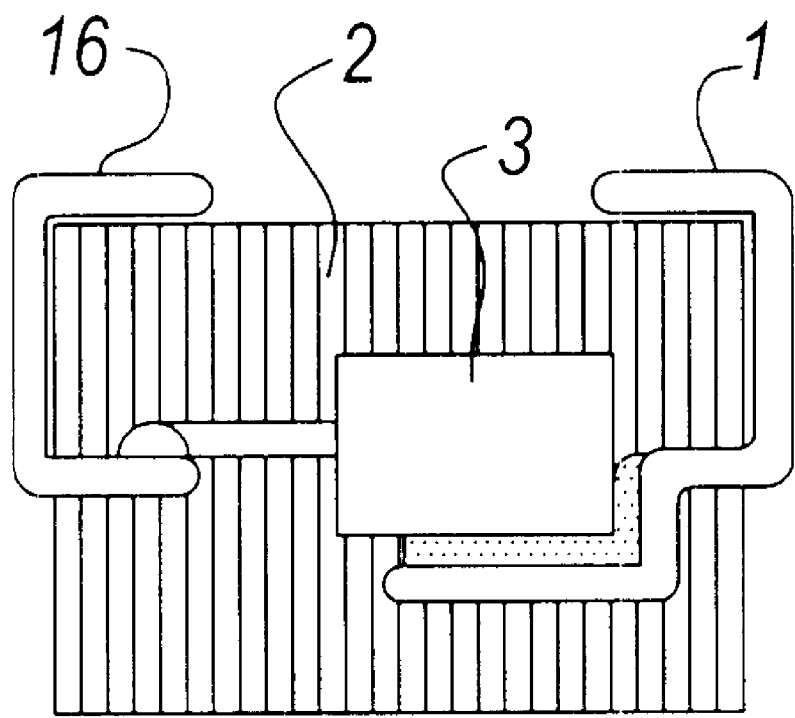

With reference to FIG. 8F, a cathode side lead frame 9a and an anode side lead frame 9b are cut and separated from the cathode and anode lead terminals 1 and 16. The cathode and anode lead terminals 1 and 16 are then bent along an outer shape of the molding resin 2.

In the above bonding process of FIG. 8D, it is possible that positioning of the device pellet lead wire 4 is made so that the device pellet lead wire 4 is not parallel to the longitudinal direction of the anode lead terminal 16 because the device pellet 3 is tilted with reference to the cathode lead terminal 1 or the device pellet lead wire 4 is tilted with reference to the device pellet 3.

Figure 9A:
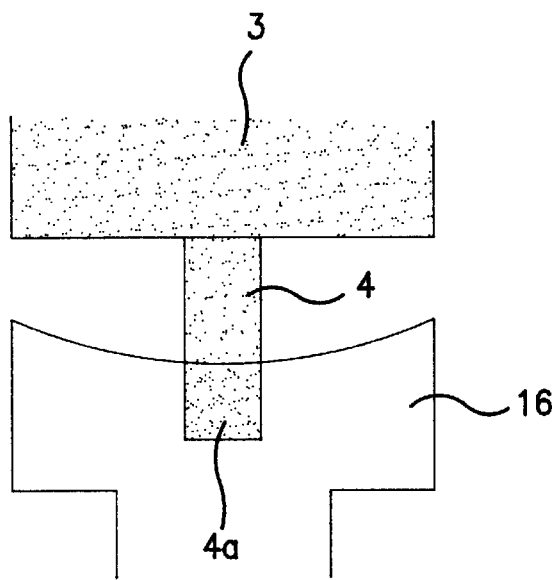
FIG. 9A is a fragmentary plan view of an anode lead terminal which is weld-bonded through an pellet lead wire to a device pellet, wherein the pellet lead wire is parallel to the anode lead terminal.
Figure 9B:
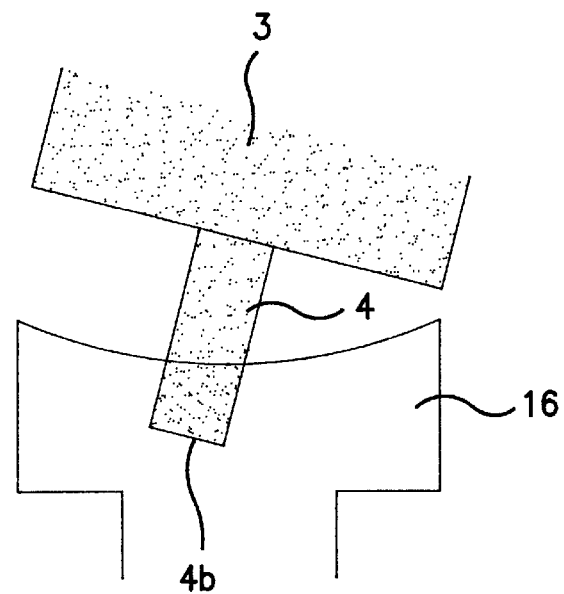
FIG. 9B is a fragmentary plan view of an anode lead terminal which is weld-bonded through an pellet lead wire to a device pellet, wherein the pellet lead wire is tilted with reference to the anode lead terminal.
Figure 10:
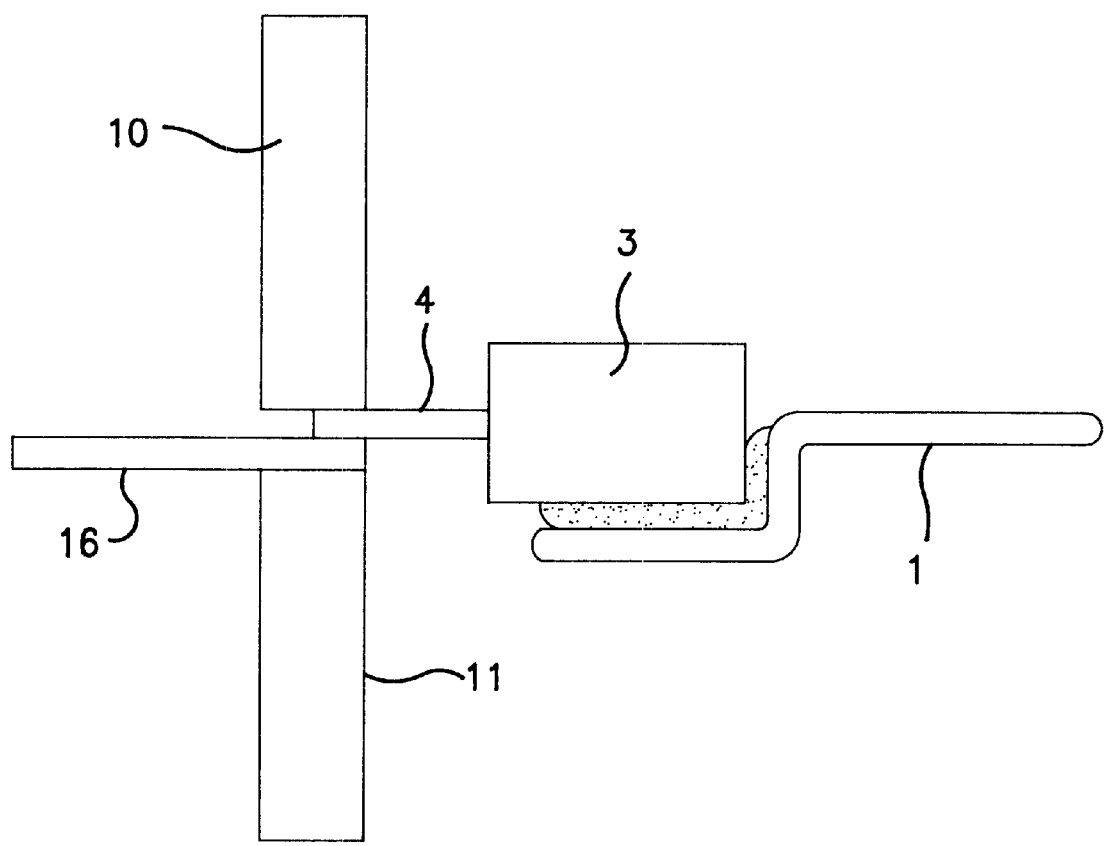
FIG. 10 is a cross sectional elevation view of the capacitor in the weld-bonding process.

FIG. 9A is a fragmentary plan view of an anode lead terminal which is weld-bonded through an pellet lead wire to a device pellet, wherein the pellet lead wire is parallel to the anode lead terminal. FIG. 9B is a fragmentary plan view of an anode lead terminal which is weld-bonded. through an pellet lead wire to a device pellet, wherein the pellet lead wire is tilted with reference to the anode lead terminal. FIG. 10 is a cross sectional elevation view of the capacitor in the weld-bonding process.

As illustrated in FIG. 9A, the pellet lead wire 4 is parallel to the longitudinal direction of the anode lead terminal 16 and perpendicular to the top straight edge of the anode lead terminal 16. An overlap region 4a between the pellet lead wire 4 and the anode lead terminal 16 is the desired one. This desired overlap region 4d ensures a sufficient and uniform area for obtaining a sufficient and uniform weld-bonding strength.

As illustrated in FIG. 9B, the pellet lead wire 4 is not parallel to and tilted from the longitudinal direction of the anode lead terminal 16. The circular-arc-defined top edge of the top portion 16c of the anode lead terminal 16 causes that causes that an overlap region 4b between the pellet lead wire 4 and the anode lead terminal 16 almost remains unchanged from the overlap region 4a. This overlap region 4b is thus substantially equal area to the overlap region 4a even the pellet lead wire 4 is tilted from the longitudinal direction of the anode lead terminal 16. This overlap region 4b obtains a sufficient and uniform area for obtaining an sufficient and uniform weld-bonding strength.

The circular-arc-defined top edge of the top portion 16c of the anode lead terminal 16 allows an increase in the size of the gap also needs size reduction of the capacitor. The circular-arc-defined top edge of the top portion 16c of the anode lead terminal 16 also allows a further size reduction of the capacitor is desired.

In addition, the circular-arc-defined top edge of the top portion 16c of the anode lead terminal 16 also allows the increase in the bonding strength and the bonding stability between the anode lead terminal and the pellet lead wire are also desired. The present invention is able to obtain both the size reduction of the capacitor and the increases in the bonding strength and the bonding stability between the anode lead terminal and the pellet lead wire.

Second Embodiment

Figure 11:
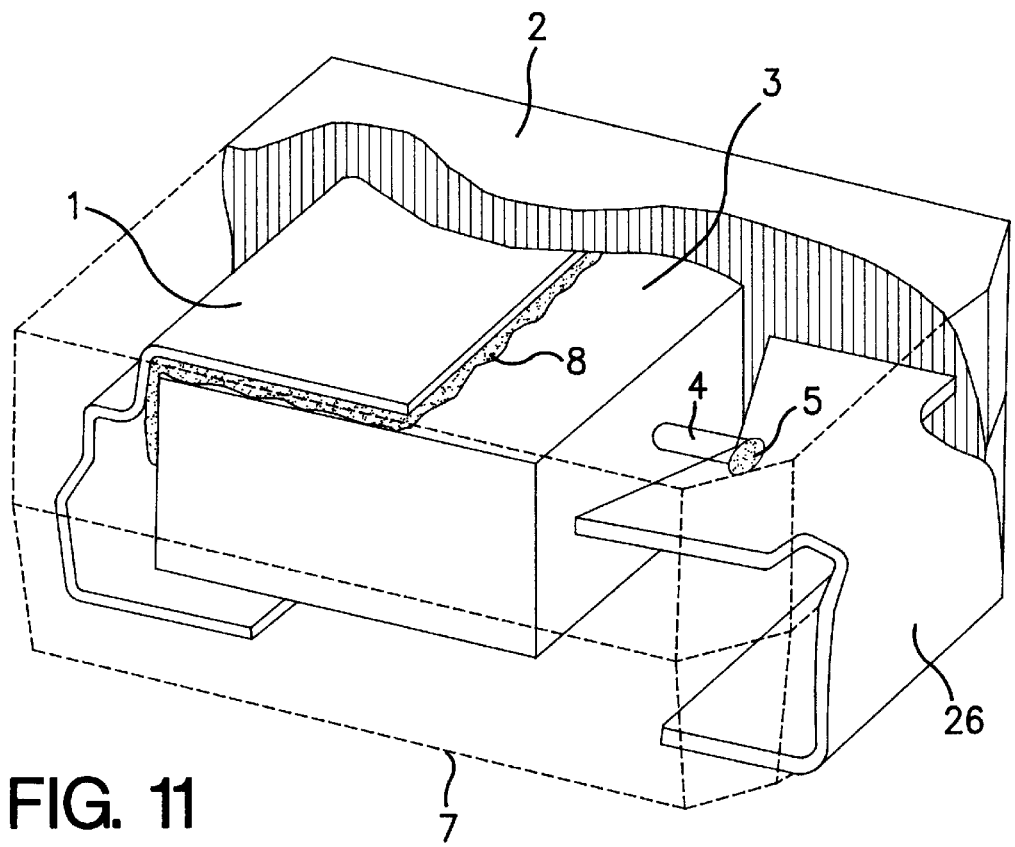
FIG. 11 is a schematic perspective view of a partial internal structure of a novel chip type solid state electrolytic capacitor in a second preferred embodiment in accordance with the present invention.
Figure 12:
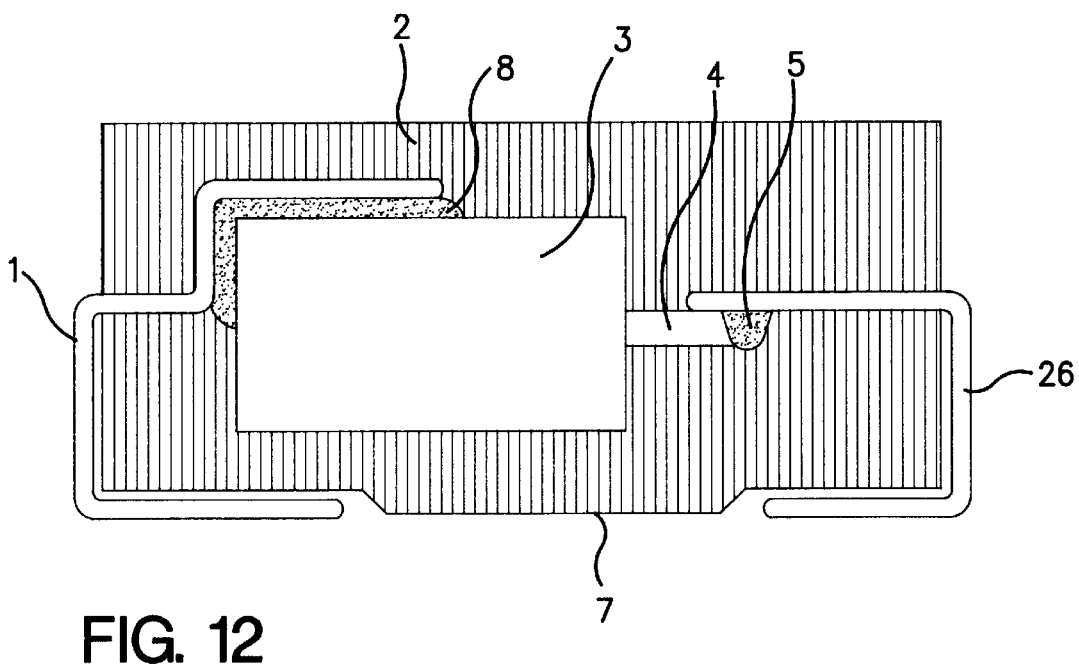
FIG. 12 is a cross sectional elevation view of the novel chip type solid state electrolytic capacitor of FIG. 11.

A second embodiment according to the present invention will be described in detail with reference to the drawings. A novel chip type solid state electrolytic capacitor is provided. FIG. 11 a schematic perspective view of a partial internal structure of a novel chip type solid state electrolytic capacitor in a second preferred embodiment in accordance with the present invention. FIG. 12 is a cross sectional elevation view of the novel chip type solid state electrolytic capacitor of FIG. 11. The internal structure of the novel chip type solid state electrolytic capacitor will hereinafter be described with reference to FIGS. 11 and 12.

The chip type solid state electrolytic capacitor 7 has a cathode lead terminal 1, a device pellet 3, and an anode lead terminal 26. The device pellet 3 has a cathode layer. The cathode lead terminal 1 is adhered via an electrically conductive adhesive agent 8 to the cathode layer of the device pellet 3. The device pellet 3 also has an pellet lead wire 4 which is welded through a weld-bonding portion 5 to the anode lead terminal 26, The capacitor 7 is encapsulated with an encapsulating resin 2, wherein respective parts of the cathode lead terminal 1 and the anode lead terminal 26 are exposed from the encapsulating resin 2. The exposed parts of the cathode lead terminal 1 and the anode lead terminal 26 extend along opposite side walls of the encapsulating resin 2 and along bottom recesses of the encapsulating resin 2.

Figure 13A:
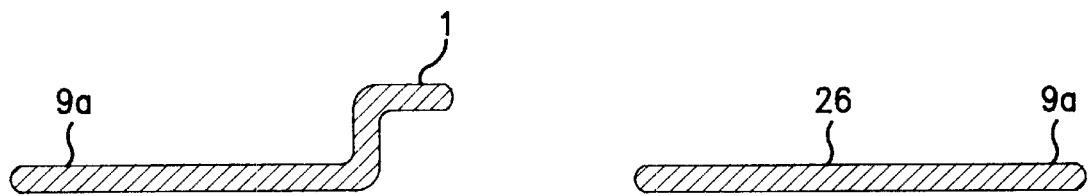
FIG. 13A is a cross sectional elevation view of unassembled original cathode and anode lead terminals prior to assembling or fabricating process to form the novel chip type solid state electrolytic capacitor of FIG. 13B is a plan view of unassembled original cathode and anode lead terminals of FIG. 13A.
Figure 13B:
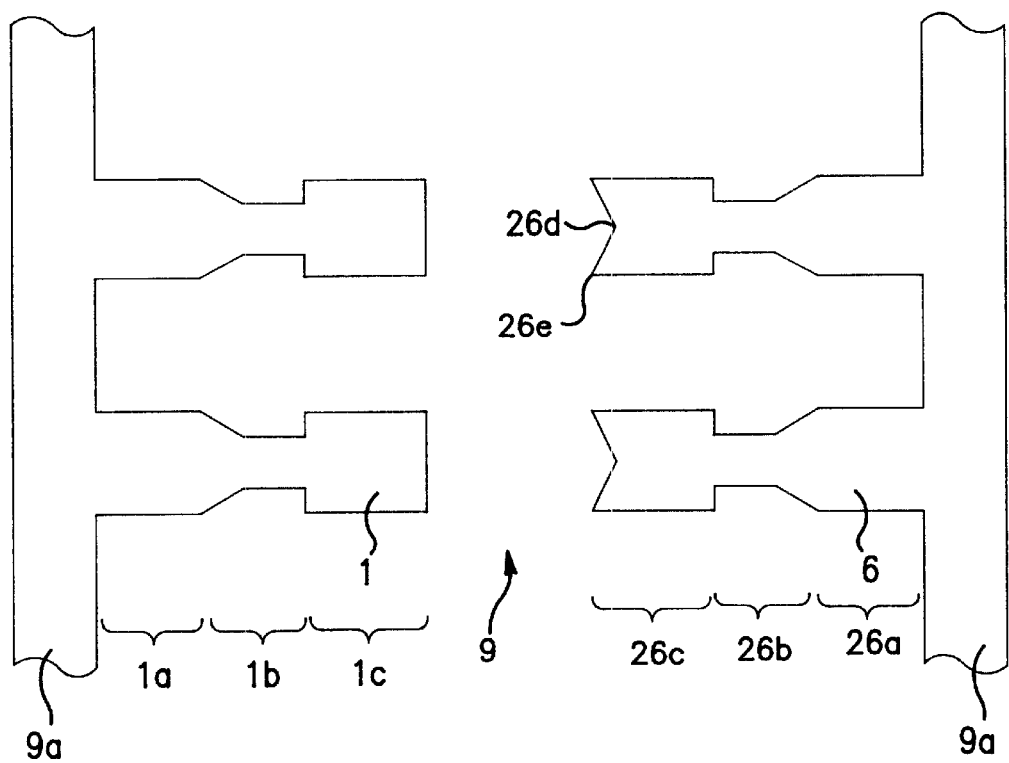

FIG. 13A is a cross sectional elevation view of unassembled original cathode and anode lead terminals prior to assembling or fabricating process to form the novel chip type solid state electrolytic capacitor of FIG. 5. FIG. 13B is a plan view of unassembled original cathode and anode lead terminals of FIG. 13A. The unassembled original cathode lead terminal 1 has a modified flat level with a step-like bent portion in cross sectional view. The unassembled original anode lead terminal 26 has a just flat level in cross sectional view. In plan view, the unassembled original cathode and anode lead terminals 1 and 26 are different in shape from each other.

Plural cathode lead terminals 1 extend from a cathode side lead frame portion 9a in a direction perpendicular to a longitudinal direction of the cathode side lead frame portion 9a. The plural cathode lead terminals 1 extend in parallel to each other and are aligned in a constant pitch in the longitudinal direction of the cathode side lead frame portion 9a.

Each of the cathode lead terminals 1 has a plan shape which comprises a base portion 1a, a narrowed intermediate portion 1b and a top portion 1c. The base portion 1a extends from the cathode side lead frame portion 9a. The base portion 1a has a constant width. The base portion 1a is flat. The narrowed intermediate portion 1b extends from the base portion 1a. The narrowed intermediate portion 1b has a reduced width. The narrowed intermediate portion 1b is flat. The top portion 1c extends from the intermediate portion 1b. The top portion 1c has a rectangle shape with the same width as the base portion 1a. The top portion 1c is not flat, and is bent in step-like shape in cross sectional view. The top portion 1c has a top edge defined by a straight line parallel to the longitudinal direction of the cathode side lead frame portion 9a.

Plural anode lead terminals 26 extend from an anode side lead frame portion 9b in a direction perpendicular to a longitudinal direction of the anode side lead frame portion 9b. The plural anode lead terminals 26 extend in parallel to each other and are aligned in a constant pitch in the longitudinal direction of the anode side lead frame portion 9b. This pitch is the same as the pitch of the cathode lead terminals 1.

Each of the anode lead terminals 26 is flat and different in plan shape from the cathode lead terminals 1. The anode lead terminal 26 comprises a base portion 26a, a narrowed intermediate portion 26b and a top portion 26c. The base portion 26a extends from the anode side lead frame portion 9b. The base portion 26a has a constant width. The base portion 26a is flat. The narrowed intermediate portion 26b extends from the base portion 26a. The narrowed intermediate portion 26b has a reduced width. The narrowed intermediate portion 26b is flat. The top portion 26c extends from the intermediate portion 26b.

The top portion 26c has a modified rectangle shape with the same width as the base portion 26a. The top portion 26c is flat. The top portion 26c has a top edge defined by a V-shape line in plan view. A length of the top portion 26c in parallel to the longitudinal direction of the anode lead terminal 26 is decreased linearly in inward directions from opposite sides positions 26e to a center position 26d. It may be regarded that a length of the top portion 26c in parallel to the longitudinal direction of the anode lead terminal 26 is increased linearly in outward directions from the center position 26d to opposite sides positions 26e.

A set of the cathode side and anode side lead frame portions 9a and 9b, the plural cathode and anode lead terminals 1 and 26 forms a single lead frame 9.

Figure 14:
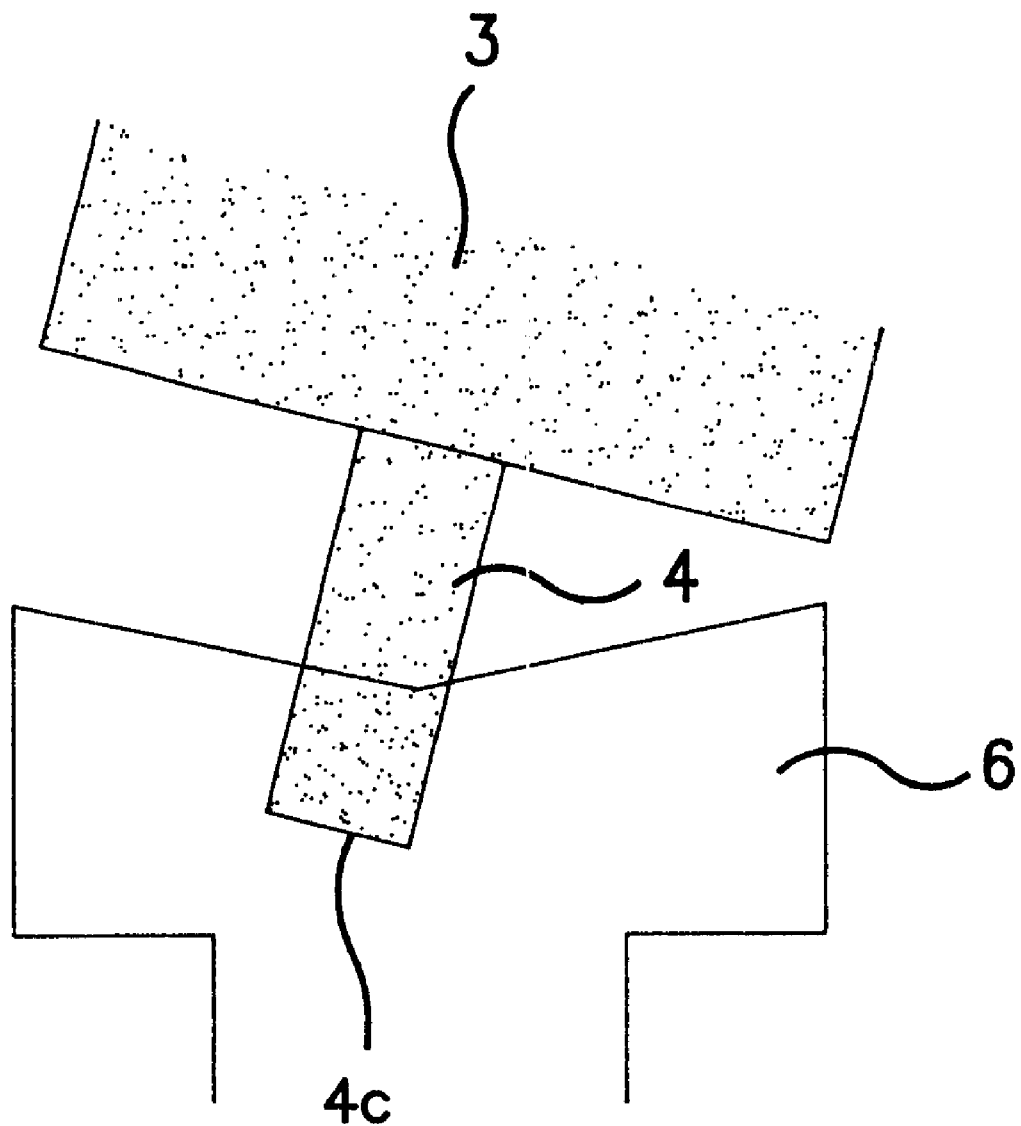
FIG. 14 is a fragmentary plan view of an anode lead terminal which is weld-bonded through an pellet lead wire to a device pellet, wherein the pellet lead wire is tilted with reference to the anode lead terminal.

FIG. 14 is a fragmentary plan view of an anode lead terminal which is weld-bonded through an pellet lead wire to a device pellet, wherein the pellet lead wire is tilted with reference to the anode lead terminal.

As illustrated in FIG. 14, the pellet lead wire 4 is not parallel to and tilted from the longitudinal direction of the anode lead terminal 26. The V-shape-defined top edge of the top portion 26c of the anode lead terminal 26 causes that causes that an overlap region 4b between the pellet lead wire 4 and the anode lead terminal 26 almost remains unchanged from the overlap region 4a. This overlap region 4b is thus substantially equal area to the overlap region 4a even the pellet lead wire 4 is tilted from the longitudinal direction of the anode lead terminal 26. This overlap region 4b obtains a sufficient and uniform area for obtaining an sufficient and uniform weld-bonding strength.

The V-shape-defined top edge of the top portion 26c of the anode lead terminal 26 allows an increase in the size of the gap also needs size reduction of the capacitor. The V-shape-defined top edge of the top portion 26c of the anode lead terminal 26 also allows a further size reduction of the capacitor is desired.

In addition, the V-shape-defined top edge of the top portion 26c of the anode lead terminal 26 also allows the increase in the bonding strength and the bonding stability between the anode lead terminal and the pellet lead wire are also desired. The present invention is able to obtain both the size reduction of the capacitor and the increases in the bonding strength and the bonding stability between the anode lead terminal and the pellet lead wire.

Although the invention has been described above in connection with several preferred embodiments therefor, it will be appreciated that those embodiments have been provided solely for illustrating the invention, and not in a limiting sense. Numerous modifications and substitutions of equivalent materials and techniques will be readily apparent to those skilled in the art after reading the present application, and all such modifications and substitutions are expressly understood to fall within the true scope and spirit of the appended claims.

What is claimed is:

1. An anode lead terminal having first and second side edges distanced from each other in a longitudinal direction of the anode lead terminal, wherein a center position on the first side edge is retracted from opposite side positions on the top edge, and the opposite side positions are distanced in a perpendicular direction to the longitudinal direction.

2. The anode lead terminal as claimed in claim 1, wherein the center position on the first side edge is retracted non-linearly.

3. The anode lead terminal as claimed in claim 2, wherein the first side edge is defined by a circular-arc line segment in plan view.

4. The anode lead terminal as claimed in claim 1, wherein the center position on the first side edge is retracted linearly.

5. The anode lead terminal as claimed in claim 4, wherein the first side edge is defined by a V-shape line segment in plan view.

6. An anode lead terminal having first and second side edges distanced from each other in a longitudinal direction of the anode lead terminal, wherein a center position on the first side edge is closer to the second side edge than opposite side positions on the top edge, and the opposite side positions are distanced in a perpendicular direction to the longitudinal direction.

7. An anode lead terminal having first and second side edges distanced from each other in a longitudinal direction of the anode lead terminal, wherein a distance of the first side edge from the second side edge is decreased in inward directions from opposite side positions on the top edge to a center position of the top edge, and the opposite side positions are distanced in a perpendicular direction to the longitudinal direction.

8. The anode lead terminal as claimed in claim 7, wherein the distance is decreased non-linearly.

9. The anode lead terminal as claimed in claim 8, wherein the first side edge is defined by a circular-arc line segment in plan view.

10. The anode lead terminal as claimed in claim 7, wherein the distance is decreased linearly.

11. The anode lead terminal as claimed in claim 4, wherein the first side edge is defined by a V-shape line segment in plan view.

12. A solid state electrolytic capacitor comprising:

a device pellet;

a cathode lead terminal connected to a first part of said device pellet;

a lead wire connected to a second part of said device pellet; and an anode lead terminal connected to the lead wire, and the anode lead terminal having first and second side edges distanced from each other in a longitudinal direction of the anode lead terminal, and the first side edge of the anode lead terminal being bonded with the lead wire, wherein a center position on the first side edge is retracted from opposite side positions on the top edge, and the opposite side positions are distanced in a perpendicular direction to the longitudinal direction.

13. The solid state electrolytic capacitor as claimed in claim 12, wherein the center position on the first side edge is retracted non-linearly.

14. The solid state electrolytic capacitor as claimed in claim 13, wherein the first side edge is defined by a circular-arc line segment in plan view.

15. The solid state electrolytic capacitor as claimed in claim 12, wherein the center position on the first side edge is retracted linearly.

16. The solid state electrolytic capacitor as claimed in claim 15, wherein the first side edge is defined by a V-shape line segment in plan view.

17. A solid state electrolytic capacitor comprising:

a device pellet;

a cathode lead terminal connected to a first part of said device pellet;

a lead wire connected to a second part of said device pellet; and an anode lead terminal connected to the lead wire, and the anode lead terminal having first and second side edges distanced from each other in a longitudinal direction of the anode lead terminal, and the first side edge of the anode lead terminal being bonded with the lead wire, wherein a center position on the first side edge is closer to the second side edge than opposite side positions on the top edge, and the opposite side positions are distanced in a perpendicular direction to the longitudinal direction.

18. A solid state electrolytic capacitor comprising:

a device pellet;

a cathode lead terminal connected to a first part of said device pellet;

a lead wire connected to a second part of said device pellet; and an anode lead terminal connected to the lead wire, and the anode lead terminal having first and second side edges distanced from each other in a longitudinal direction of the anode lead terminal, and the first side edge of the anode lead terminal being bonded with the lead wire, wherein a distance of the first side edge from the second side edge is decreased in inward directions from opposite side positions on the top edge to a center position of the top edge, and the opposite side positions are distanced in a perpendicular direction to the longitudinal direction.

19. The anode lead terminal as claimed in claim 18, wherein the distance is decreased non-linearly.

20. The anode lead terminal as claimed in claim 19, wherein the first side edge is defined by a circular-arc line segment in plan view.

21. The anode lead terminal as claimed in claim 18, wherein the distance is decreased linearly.

22. The anode lead terminal as claimed in claim 21, wherein the first side edge is defined by a V-shape line segment in plan view.

* * * * *